United States Patent
Yamada

(10) Patent No.: US 6,769,740 B2
(45) Date of Patent: Aug. 3, 2004

(54) MECHANISM OF RECLINING VEHICULAR SEAT

(75) Inventor: Nobuo Yamada, Kariya (JP)

(73) Assignee: Nihon Technica, Co., Ltd., Kariya (JP)

(*) Notice: Subject to any disclaimer, the term of this patent is extended or adjusted under 35 U.S.C. 154(b) by 0 days.

(21) Appl. No.: 10/443,828

(22) Filed: May 23, 2003

(65) Prior Publication Data

US 2003/0218371 A1 Nov. 27, 2003

(30) Foreign Application Priority Data

May 27, 2002 (JP) ........................................ 2002-152319

(51) Int. Cl.⁷ .............................................. B60N 2/02
(52) U.S. Cl. ...................................................... 297/366
(58) Field of Search .................................. 297/362, 366, 297/367, 368, 369, 373

(56) References Cited

U.S. PATENT DOCUMENTS

| | | | | |
|---|---|---|---|---|
| 5,755,491 | A | * | 5/1998 | Baloche et al. |
| 6,024,410 | A | * | 2/2000 | Yoshida |
| 6,318,805 | B1 | * | 11/2001 | Asano |
| 6,332,649 | B1 | * | 12/2001 | Vossmann |
| 6,454,354 | B1 | * | 9/2002 | Vossmann et al. |
| 2002/0043852 | A1 | * | 4/2002 | Uramichi |
| 2002/0140267 | A1 | * | 10/2002 | Ikegaya et al. |
| 2002/0185903 | A1 | * | 12/2002 | Hosokawa |

FOREIGN PATENT DOCUMENTS

| | | |
|---|---|---|
| JP | 10-71042 | 3/1998 |
| JP | 11-70028 | 3/1999 |
| JP | 2000-102440 | 4/2000 |

* cited by examiner

Primary Examiner—Milton Nelson, Jr.
(74) Attorney, Agent, or Firm—Westerman, Hattori, Daniels & Adrian, LLP

(57) ABSTRACT

A mechanism of reclining a vehicular seat having a gear plate having an internal gear provided at a casing on one side having a hole, a side wall and a recess portion, a cam having a lock face and an unlock face, a lock gear plate arranged movably at the recess portion and having a locking portion and a lock face and a casing on other side provided to be opposed to the casing on the one side and is a mechanism of reclining a vehicular seat in which by moving the cam, an operating member is operated to bend, the lock gear plate is moved, by moving the lock gear plate, mesh between the gear and the internal gear is released, by moving the cam to an original state, the lock gear plate is recovered by operating the operating member to recover to an original state to thereby achieve mesh between the gear of the lock gear plate and the internal gear.

4 Claims, 5 Drawing Sheets

MECHANISM OF RECLINING VEHICULAR SEAT

BACKGROUND OF THE INVENTION

1. Field of the Invention

The present invention relates to a mechanism of reclining a vehicular seat.

2. Description of the Related Art

In related arts, various modes are adopted for a reclining mechanism provided at a seat frame of a vehicle. A basic structure thereof is constituted by a casing on one side having a hole for an operating shaft, a gear plate having an internal gear provided at the casing on one side, a lock gear plate having a gear brought in mesh with the internal gear of the gear plate, a cam cooperatively operating with the lock gear plate via a locking pin or slidable contact and a spiral spring governing recovery of the cam. Therefore, the lock gear is moved in an up and down direction by movement of the cam in the clockwise direction (as an example). There is constituted a structure which is locked by bringing the lock gear and the internal gear in mesh with each other and unlocked conversely by separating the lock gear from the internal gear by the movement in the up and down direction. Further, the spiral spring is used for achieving firm and smooth recovery of the cam.

A problem of the conventional structure explained above will be pointed out. First, there is constructed a structure in which the lock gear plate is moved by moving the cam, the moving member and the locking pin, further, the lock gear plate is recovered by recovering the spinal spring and moving the cam, the moving member and the locking pin. Therefore, it is pointed out that movement of the locking pin and the cam is not smooth, the unlocking operation is not carried out firmly and pertinently, recovery of the spiral spring is not smooth and the locking operation is not carried out firmly and pertinently. Next, there is constructed a structure in which the lock gear plate is moved by sliding contact of the lock gear plate with an open peripheral face of the cam and the lock gear plate is recovered by recovering the coil spring and by way of a lock peripheral face of the cam. Therefore, it is pointed out that the locking or the unlocking operation is carried out by individually operating recovery of the coil spring and rotation of the cam and therefore, the locking or the unlocking operation cannot be carried out firmly and pertinently.

Further, the following inventions are pointed out as related literatures.

Literature (1) is a reclining apparatus of JP-A-2000-102440 and a content thereof is a unitized reclining apparatus having a constitution for providing a base plate having a lock gear, a gear plate having an inner teeth and a spring locking the base plate and the gear plate by bringing the inner teeth and an outer teeth of the lock gear in mesh with each other, rotating a seat by ensuring to unlock the seat by opening the mesh by rotating a cam and recovering the cam, wherein the cam is recovered by reaction force of the spring, initial locking is ensured by the mesh of the base plate and the gear plate and a stopper member attachable to and detachable from a guide groove of the gear plate is provided and is a reclining apparatus capable of arbitrarily setting a reclinable range of a seat back and capable of being commonly used even for a seat of an automobile of a different vehicle kind.

Literature (2) is a hinge mechanism for a seat for a vehicle and a vehicular seat having such a mechanism of JP-A-11- 70028, as a content thereof, a hinge mechanism is provided with a slug with teeth moving at a fixed side face plate (progressing in a circumferential direction or regressing in a center direction), the slug with teeth is made movable at a face of the fixed side face plate by way of a restriction of the fixed side face plate. Therefore, the slug with teeth progresses on the face of the fixed side face plate via a cam, a peg and a plate and locks movement of a seat, further, the slug with teeth is constituted to regress on the face of the fixed side face plate via the cam, the peg and the plate as well as a spring and unlocks movement of the seat and when a back rest is fallen forwardly and thereafter made to rise, a position of the backrest which has been adjusted lastly can be automatically recovered to be locked, further, the hinge mechanism for a vehicular seat having strength equivalent to that of a conventional product is provided.

Literature (3) is a seat reclining apparatus of JP-A-10-71042 and a content thereof is a reclining mechanism constituted by an upper arm, a lower arm and a restricting member, the reclining mechanism is provided with pairs of ratchets having inner teeth and movable poles in mesh with the inner teeth, constituted by a cam with arm for moving the pole and a spring for restricting mesh of the ratchet and the inner teeth, and the pole is moved in an up and down direction by locking the inclined arm portion provided at the cam and an inclined arm groove provided at the pole and moving the arm portion of the cam. Further, there is provided the seat reclining apparatus constituted by bringing the inner teeth and an outer teeth of the pole by making the pole progress, locking the movement of the seat, opening the mesh between the inner teeth and the outer teeth of the pole by making the pole regress and unlocking movement of the seat and having sufficient rigidity against load applied on a seat back.

In sum, the inventions of literatures (1) through (3) are constructed by a constitution of locking or unlocking the seat by bringing the cam rotated by the operating shaft, the teeth portion of the lock gear moved in the up and down direction via the movement of the cam and the internal gear in mesh with the lock gear or by releasing the mesh. Further, the mesh is carried out by operating the operating shaft and the movement of the cam rotated against reaction force of the spring and the mesh is released by recovering the operating shaft and the cam rotated reversely by the reaction force of the spring.

That is, the above-described inventions of literatures (1) through (3) are constructed by the constitution of moving the lock gear by the movement of the cam by the operating shaft and the both members are constructed by a constitution of cooperatively moving via face contact. Therefore, there are conceivable problems that the movement of the operating shaft is not firmly transmitted to the lock gear, firm movement in a front and rear direction of the seat is not ensured, a failure is caused depending on a frequency of use, or smooth movement of the lock gear is not guaranteed, for example, a strange feeling is felt in-the movement of the seat.

SUMMARY OF THE INVENTION

Embodiments of the invention will be explained as follows. In a state of FIG. 1, FIG. 5 or FIG. 6, is a state in which operating means (not illustrated) for operating a reclining mechanism is free (a state in which back rest is erected), an operating shaft is stopped and the state is a so-to-speak state of fixing a seat (is not pivoted). In the state, a lock face of a lock gear plate and a lock face of a cam are brought into a relationship of face contact, the lock gear plate is disposed on an upper side and a gear of the lock gear plate and an internal gear of a gear plate are brought into a mesh relationship. Therefore, a fixed state (locked state) of the seat is held by the mesh relationship of the cam, a spring and the gear. Further, an operating portion of the spring is disposed at an unlock face of the cam and brought into a relaxed state (main body portion is brought into substantially a linear state) and two end portions of the spring are inserted into a locking hole of the lock gear plate in a loosely fitted state. Further, in an actual apparatus, it can be recognized that a lock state is ensured in a range of around angle A of the operating shaft (as an example: the same as follows).

In operating the reclining mechanism (moving the seat), when the operating means is grabbed and the operating means is pivoted in either of directions, the operating shaft is rotated (the operating shaft can automatically be operated). By rotating the operating shaft, the cam is rotated. Therefore, a face contact relationship between a lock face of the cam and a lock face of the lock gear plate is lost. Further, by further rotating the cam, there is brought about a state of pressing the operating portion of the spring by the lock face of the cam and the operating portion is moved (bent) in an outer peripheral direction of the cam. Further, in accordance with the operation, the two end portions are moved to an axis core direction (inner direction) of the cam and the lock gear plate is pulled down in accordance with the movement. By pulling down the lock gear plate, the seat is moved by releasing the mesh relationship between the gear of the lock gear plate and the internal gear of the gear plate. That is, the operating shaft falls in a range of around angle B and movement of the seat is ensured. Thereafter, by rotating the operating shaft further, free movement of the gear plate (unlocked state) is guaranteed and the movement of the seat becomes a final stage. Further, in the actual apparatus, in a range of around angle C of the operating shaft, it can be recognized that the unlocked state is ensured.

Further, in recovering the seat from the moved state to the initial state, by releasing the operation with respect to the operating shaft or recovering automatically, the cam is rotated, when the cam presses the lock face, the operating portion of the spring is released, the operating portion is recovered, the spring is successively recovered, the lock gear plate is moved in a direction opposed to the axis core (outer direction) and the lock gear plate is pushed up in accordance with the movement. By pushing up the lock gear plate, the mesh relationship between the gear of the lock gear plate and the internal gear of the gear plate is brought about, finally, the initial state is recovered.

DETAILED DESCRIPTION OF THE PREFERRED EMBODIMENTS

Figure 1:
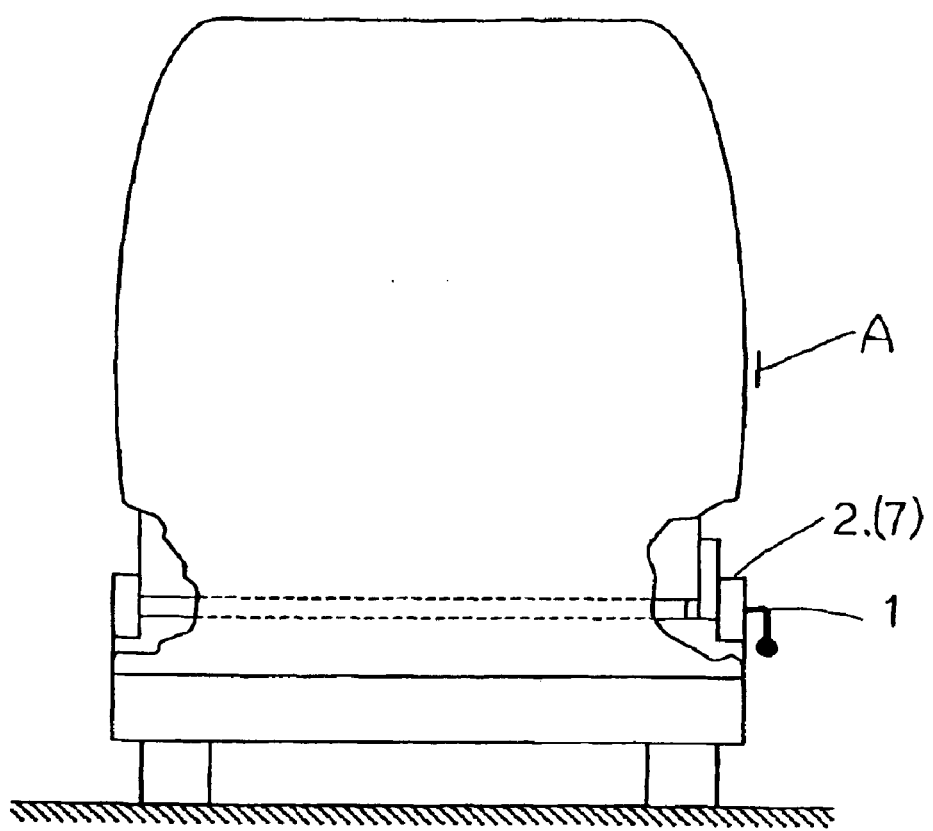
FIG. 1 is a partially cut front view for explaining a relationship between a seat of a vehicle and a first embodiment of the invention.

An explanation will be given of an embodiment of the invention as follows.

Numeral 1 designates an operating shaft or operating means of a lever or the like (designated as operating shaft 1) connected to a connecting shaft provided at a reclining apparatus of a seat A and the operating shaft 1 is fitted to a hole 202 of a casing 2 on one side having a side wall 200 and a recess portion 201 for fitting a lock gear. The recess portion 201 of the casing 2 on one side is rotatably provided with a cam 3 having a lock face 300 and an unlock face 301 and a hole 302 for penetrating the operating shaft 1. Further, the recess portion 201 is provided with a pair of lock gear plates 4 arranged with the cam 3 at a middle thereof to interpose the cam 3. A gap 40 is formed between the pair of lock gear plates 4 and the lock gear plates 4 are moved within a range of the gap 40. Further, the lock gear plates 4 are provided with locking portions 400 and an operating member (spring 5) is locked between the locking portions 400. Further, a gear 401 is provided at an outer peripheral end of the lock gear plate 4. Numeral 402 in the drawings designates a lock face provided at the lock gear plate 4 and in a state in which the lock face 402 is brought into contact with the lock face 300 of the cam 3, a mesh relationship between the gear 401 of the lock gear plate 4 and an internal gear 600 of a gear plate 6, mentioned later, is established. That is, fixing a state of moving the seat is achieved. Further, the operating shaft 1 and the cam 3 are constituted by individual structures as illustrated, or an integrated structure or other structure which is pertinently selected in view of mode (large or small, material, shape, or thickness), in view of strength, in view of cost, in view of fabrication or in view of integration.

Figure 2:
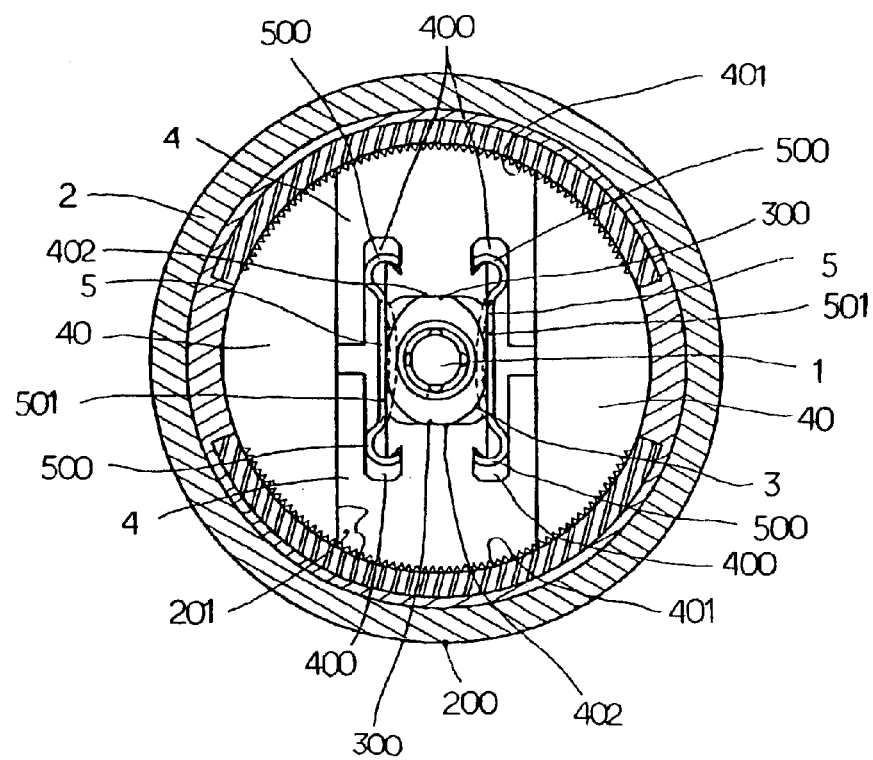
FIG. 2 is a partially cut front view of an essential portion showing a locked state of the first embodiment according to the invention.
Figure 3:
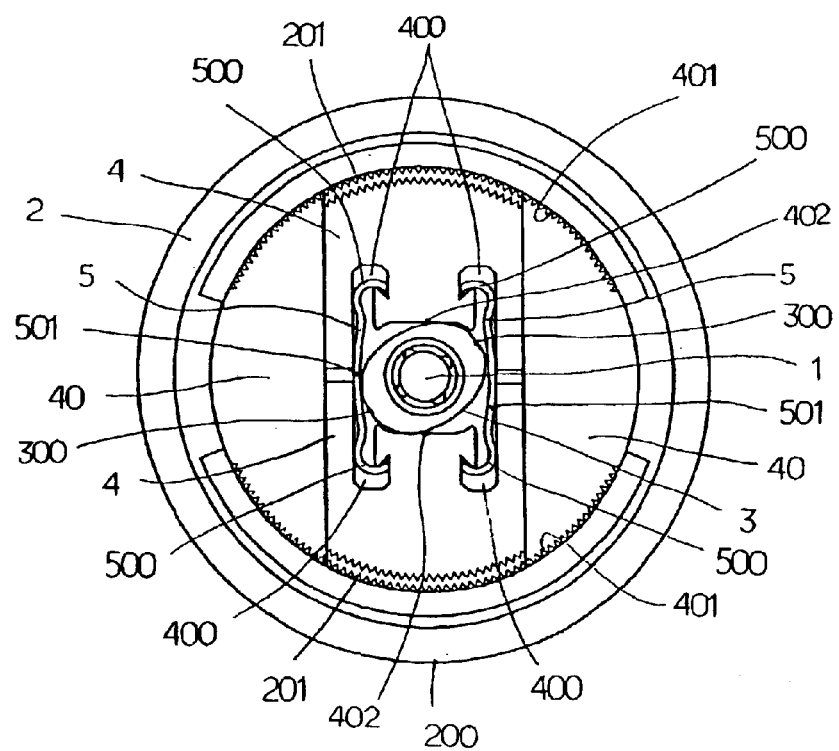
FIG. 3 is a front view showing an unlocked state of the example of FIG. 2.
Figure 4:
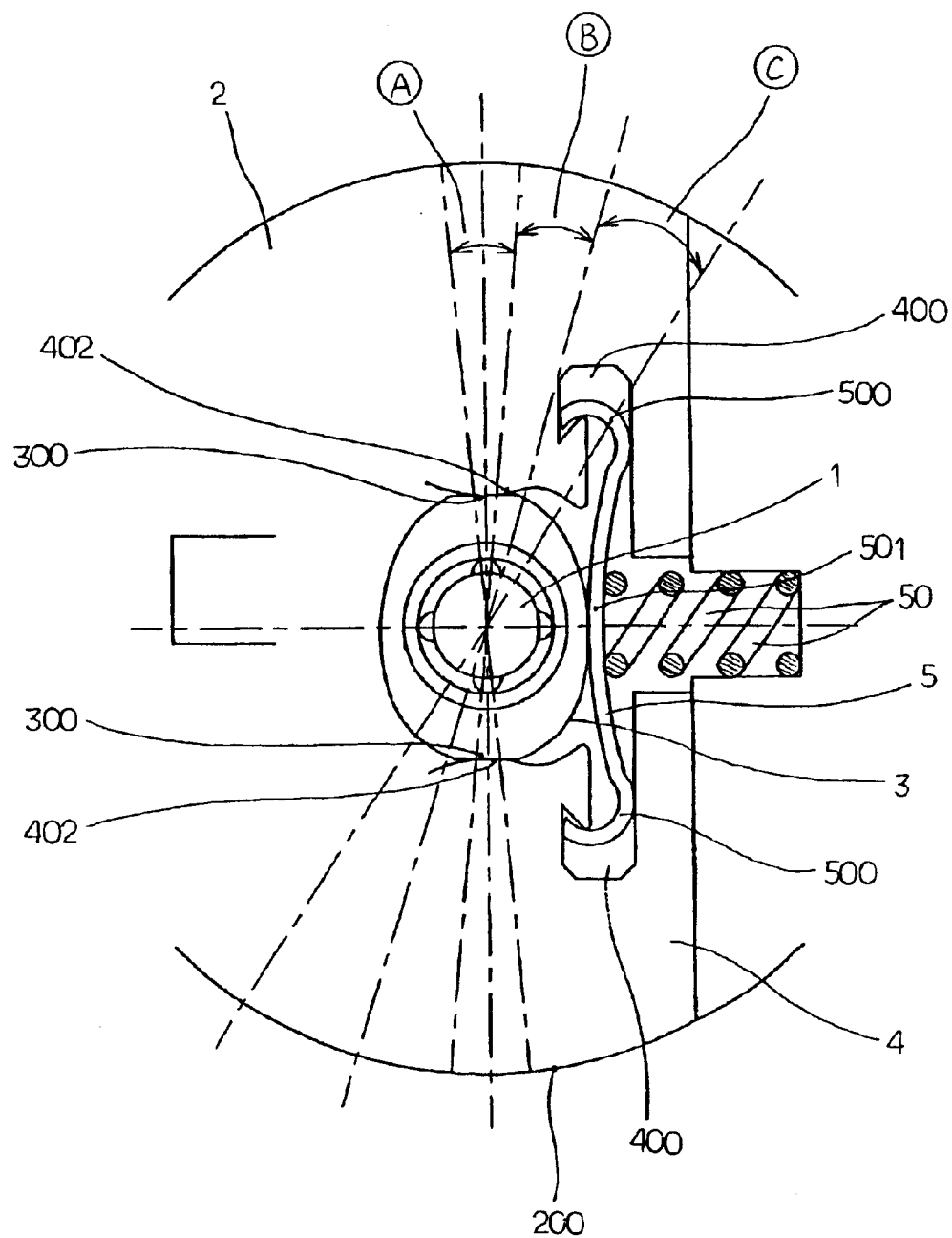
FIG. 4 is a schematic view enlarging an essential portion for explaining operation of the example of FIG. 2.
Figure 5:
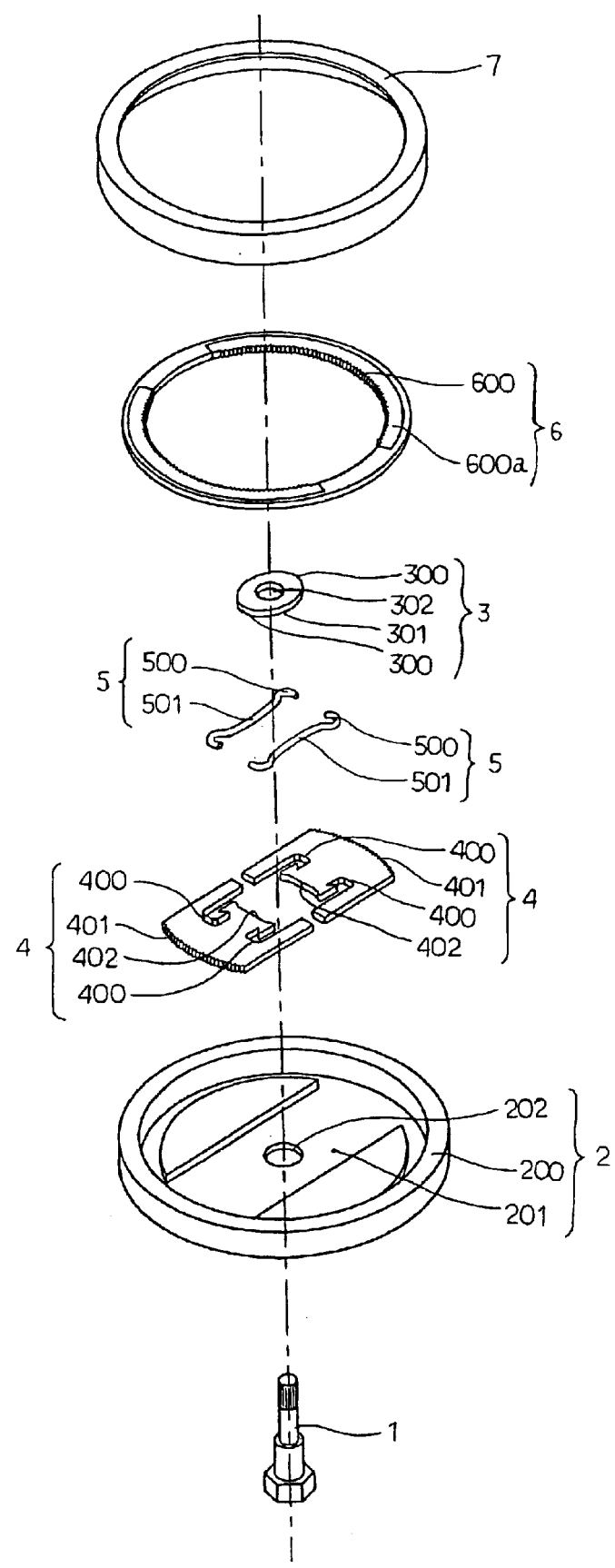
FIG. 5 is a disassembled perspective view contracting the example of FIG. 2.
Figure 6:
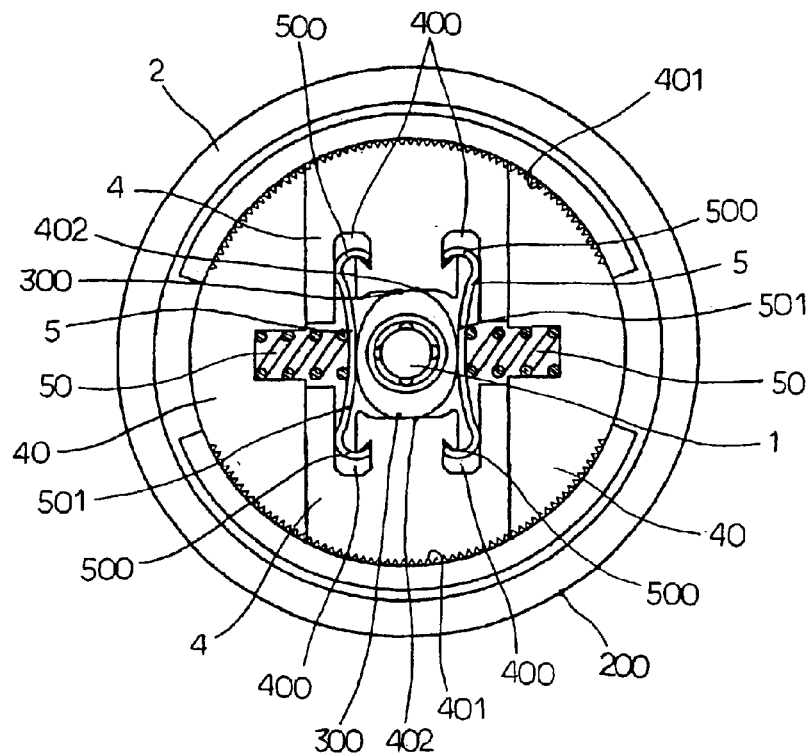
FIG. 6 is a partially cut front view of an essential portion showing a locked state according to a second embodiment of the invention.
Figure 7:
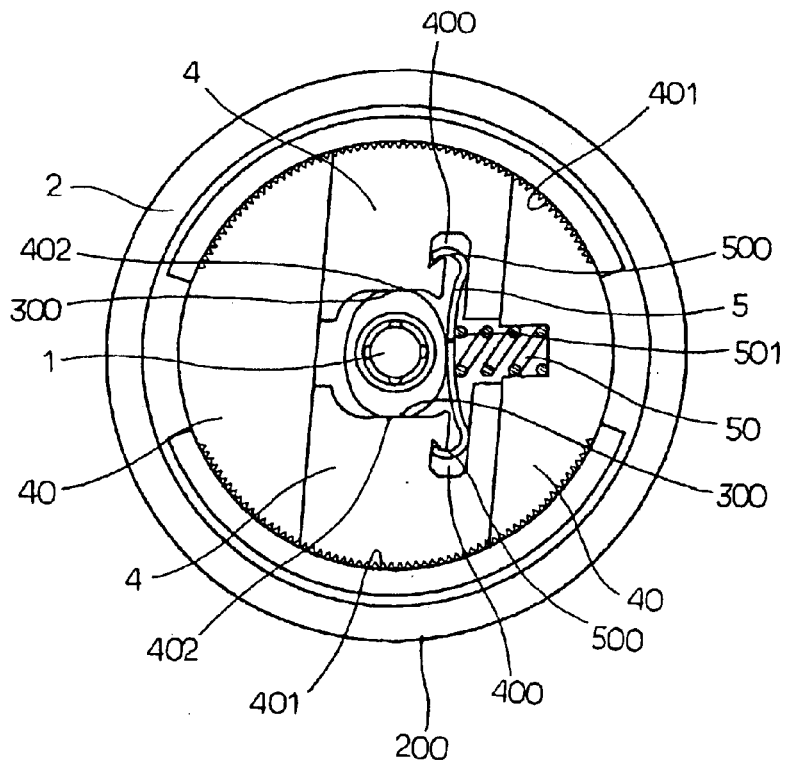
FIG. 7 is a partially cut front view of an essential portion showing a locked state according to a third embodiment of the invention.

Two end portions 500 of the spring 5 are provided between the locking portions 400 of the pair of lock gear plates 4 and the two end portions 500 are pulled to an axis core direction by pressing (bending) operating portions 501 of the spring 5 by the cam 3 substantially in a hat-like shape in front view. By approaching the two end portions 500, the pair of lock gear plates 4 are moved to the axis core direction. Further, the two end portions 500 are moved in directions opposed to the axis core by releasing the operating portions 501 of the spring 5 (recovering to an original state) to a substantially parallel state in front view by the cam 3, the two end portions 500 are separated from each other and the pair of lock gear plates 4 are moved in directions opposed to the axis core. Therefore, the gears 401 of the pair of lock gear plates 4 and the internal gears 600 of the gear plate 6, mentioned later, are brought in mesh with each other. Further, a constitution of providing an auxiliary spring 50 at least at one face of the spring 5 as necessary serves to reinforce the spring 5, ensure swift repulsion force, or ensure certainty of operation. Further, there are an example of constituting the pair of springs 5 (refer to FIG. 2 through FIG. 6) and an example of constituting a single one of the spring 5 (refer to FIG. 7) which are pertinently selected. The constitution of the pair of springs 5 serves to promote certainty, smooth operation and durability. Further, the constitution of a single one of the spring 5 serves to promote low cost formation and small-sized formation of the apparatus. Further, there is also an example of a single piece of the spring 5 in which the auxiliary spring 50 is not provided. Further, according to the example, it is ideal to preferably provide the pair of lock gear plates 4 in a slightly inclined state. Further, a mode, a wire shape, a wire diameter or the like of the spring 5 is pertinently set. Further, the spring 5 is naturally provided with necessary structure, function, property and the like. Further, as a preferable embodiment of the spring 5, as shown by an imaginary line of FIG. 2, in a state before being attached, the operating portion 501 may be provided with a shape constricted to an inner side. Thereby, in a state of being integrated as shown by a bold line of FIG. 2, there is achieved a feature capable of ensuring a state in which the lock face 402 of the lock gear plate 4 is brought into contact with the lock face 300 of the cam 3.

Numeral 6 designates the gear plate provided at an inner peripheral ring-like portion of the recess portion 201 provided at the casing 2 on one side and the internal gear 600 is provided at a portion of an inner peripheral face of the gear plate 6. Further, although according to the example, there is constituted a structure of casting an internal gear main body 600a having the internal gear 600 to the gear plate 6, the invention is not limited to the example but, for example, there may be a case of an integrated structure of the internal gear 600 and the gear plate 6. Further, also with regard to constituent members, the internal main body 600a may be made of a metal and the gear plate 6 may be made of a resin to thereby achieve light-weighted formation or a reduction in cost. Further, all of the constituent members may be made of metal or all of the constituent members may be made of resin as necessary.

Numeral 7 designates a casing on other side which is fixed to the casing 2 on one side by pertinent means.

A first aspect of the invention is a mechanism of reclining a vehicular seat comprising a casing on one side including a hole, a side wall and a recess portion, a gear plate including an internal gear provided at the casing on the one side, a cam fixed to an operating shaft and having a lock face and an unlock face, a lock gear plate arranged movably at a recess portion provided on an outer side of the cam and including a locking portion and a lock face, an operating member provided at the locking portion of the lock gear plate, and a casing on other side provided to be opposed to the casing on the one side and is a mechanism for reclining the vehicular seat having a constitution in which the lock gear plate is moved by rotating the cam and moving the operating member, the mesh between the gear of the lock gear plate and the internal gear of the gear plate is released, the lock gear plate is recovered by rotating the cam and moving the operating member to thereby achieve the mesh between the gear of the lock gear plate and the internal gear of the gear plate.

Therefore, there are achieved characteristics that firm movement of the gear plate in the front and rear direction can be ensured by directly transmitting movement of the operating shaft to the operating member via the cam, a failure is not caused (durability is promoted) even when a frequency of use is increased, or smooth movement of lock gear plate is guaranteed, for example, smooth movement of the seat can be ensured and so on. Further, there are achieved merits that the reclining mechanism can be enjoyed without a strange feeling by ensuring smooth movement of the seat, or firm movement can be ensured, further, the human body is not impaired at a sudden time.

A second aspect of the invention is the mechanism of reclining a vehicular seat according to the first aspect, wherein the operating member comprises a spring, the spring is operated to bend substantially in a hat-like shape in a front view to thereby move the lock gear plate in an up and down direction. Therefore, in adopting the operating member according to the first aspect, there are achieved the characteristics that the most standard apparatus can be provided, the inherent object can firmly and smoothly be achieved, further, an apparatus which is inexpensive and achieving durability and compatibility can be provided and so on.

A third aspect of the invention is the mechanism of reclining a vehicular seat according to the first aspect, wherein the operating member comprises a pair of springs, a pair of the lock gear plates are provided at an interval therebetween, the respective springs are operated to bend respectively substantially in a hat-like shape in a front view and the respective lock gear plates are respectively moved in an up and down direction. The mechanism of the operating member and the lock gear plate optimum for achieving the invention according to the first aspect can be provided.

A fourth aspect of the invention is the mechanism of reclining a vehicular seat according to the first aspect, wherein a spring for governing the recovery of the operating member is provided and recovery of the operating member is made smooth by utilizing recovery of the spring. Therefore, the mechanism of the operating member optimum for achieving the invention according to the first aspect can be provided.

What is claimed is:

1. A mechanism for reclining a vehicular seat, said reclining mechanism comprising:

a first casing including a hole for an operating shaft, a side wall and a recess portion for inserting a lock gear plate; and a second casing provided to be opposed to the first casing;

wherein the first casing comprises:

an internal gear plate including an internal gear at an inner face thereof;

a cam including a lock face and an unlock face fixed to the operating shaft;

a lock gear plate provided on an outer side of the cam provided at the recess portion of the first casing and including a lock face and a locking portion provided at a side of a side face of the lock face; and an operating member provided at the locking portion of the lock gear plate;

wherein the operating member is expanded and contracted by rotating the cam to thereby enable a user to make the lock gear plate progress and regress.

2. The mechanism for reclining a vehicular seat according to claim 1, wherein the operating member comprises a spring, the spring is operated to bend substantially in an arcuate shape in a front view to thereby move the lock gear plate in an up and down direction.

3. The mechanism for reclining a vehicular seat according to claim 1, wherein the operating member is constituted by a pair of springs, a pair of the lock gear plates are provided at an interval therebetween and the respective springs are respectively operated to bend substantially in an arcuate shape in a front view to thereby respectively move the respective lock gear plates in an up and down direction.

4. The mechanism for reclining a vehicular seat according to claim 1, further comprising:

an auxiliary spring for governing recovery of the operating member;

wherein the operating member is recovered smoothly by utilizing recovery of the auxiliary spring.

* * * * *